United States Patent

Funato

[11] 4,348,080
[45] Sep. 7, 1982

[54] OPTICAL SCANNING APPARATUS AND METHOD

[75] Inventor: Hiroyoshi Funato, Chigosaki, Japan

[73] Assignee: Ricoh Company, Ltd., Japan

[21] Appl. No.: 85,486

[22] Filed: Oct. 17, 1979

[30] Foreign Application Priority Data

Oct. 25, 1978 [JP] Japan .................. 53/131332

[51] Int. Cl.³ ............................. G02B 27/17
[52] U.S. Cl. .................................. 350/3.71
[58] Field of Search .......... 350/3.71, 3.8, 358, 350/3.73, 3.79; 250/553

[56] References Cited

U.S. PATENT DOCUMENTS

| 3,728,031 | 4/1973 | Watson | 250/553 |
| 3,980,389 | 9/1976 | Huignard et al. | 350/3.71 |
| 4,000,493 | 12/1976 | Spaulding et al. | 350/358 |
| 4,133,600 | 1/1979 | Russell et al. | 350/3.72 |
| 4,239,326 | 12/1980 | Kramer | 350/3.71 |

FOREIGN PATENT DOCUMENTS

| 52-48335 | 4/1977 | Japan | 350/3.73 |
| 5553311 | 10/1978 | Japan | 350/3.71 |

OTHER PUBLICATIONS

Sincerbox G. T., "Formation of Optical Elements by Holography", IBM Tech. Disclosure Bulletin, vol. 10, No. 3, Aug. 1967, pp. 267-268.

Primary Examiner—John K. Corbin
Assistant Examiner—Bruce Y. Arnold
Attorney, Agent, or Firm—McGlew and Tuttle

[57] ABSTRACT

In an optical scanning apparatus, a hologram prepared by the interference of two rays of light, each of which has a spherical wave or one of which has a spherical wave and the other of which has a plane wave, is illuminated by a reconstruction light containing an image signal, and the reconstruction light and the hologram are moved relative to each other. A beam produced from the hologram in accordance with the relative movement of the hologram is led onto a surface to be scanned, while continuously changing its output angle, and plural beams containing image information therein, which are modulated by plural and different image signals, are caused to enter the hologram simultaneously. Plural beams are thus diffracted and plural lines on the surface to be scanned are scanned simultaneously.

1 Claim, 9 Drawing Figures

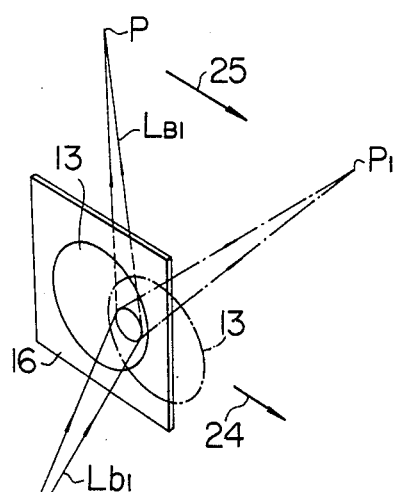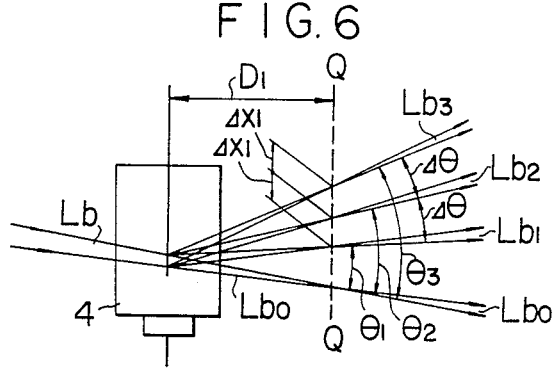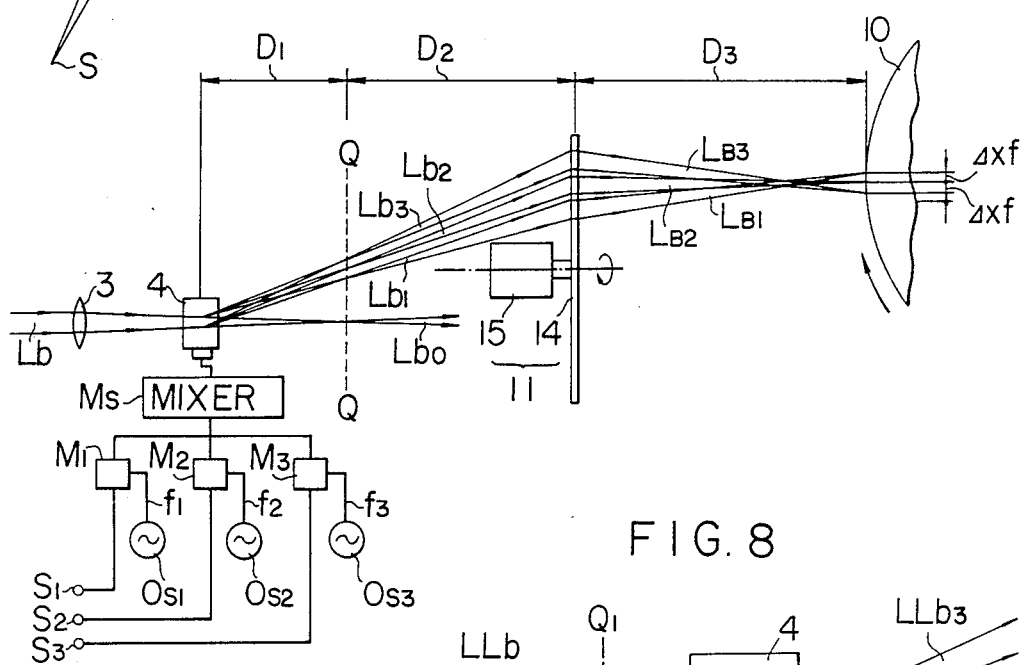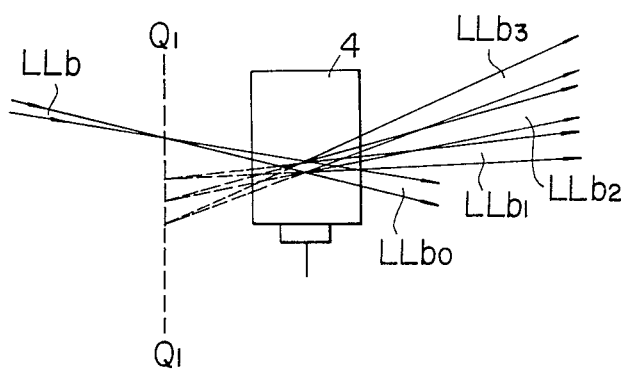

OPTICAL SCANNING APPARATUS AND METHOD

BACKGROUND OF THE INVENTION

This invention relates to an optical scanning apparatus and method.

Conventionally, a multi-beam optical scanning system capable of scanning plural lines at a time is proposed as a high speed processing means for use in an output apparatus of a computer, of an information receiving and recording apparatus for facsimile systems, or of copying machines.

One example of such multi-beam optical scanning systems is the so-called laser plotter utilizing laser beams, in which a laser plotter utilizing a rotary polyhedral mirror is used as an optical scanning means.

Referring to FIG. 1, there is shown a conventional laser recording apparatus. In FIG. 1, reference numeral 1 represents a laser light source, reference numeral 2 a beam expander, reference numeral 3 a convergent lens, reference numeral 4 an acousto-optic device driven by multi-frequency, reference numeral 5 a magnification adjustment lens, reference numeral 6 a cylindrical lens, reference numeral 7 a rotary polyhedral mirror, reference numeral 8 a lens, reference numeral 9 another cylindrical lens, and reference numeral 10 a photoconductor drum.

A laser beam $L_b$ coming from the laser light source 1 is expanded in its beam diameter by the beam expander 2 and is then caused to converge by the convergent lens 3 and illuminates the acousto-optic device 4.

In the meantime, modulated signals, which are modulated by plural image signals, are applied to the acousto-optic device 4 (arrow 4a) and therefore plural beams containing each image information, such as $L_{b1}$, $L_{b2}$ and $L_{b3}$ in FIG. 1 are projected from the acousto-optic device 4.

These beams $L_{b1}$, $L_{b2}$ and $L_{b3}$, passing through the magnification adjustment lens 5 and the cylindrical lens 6, are continuously reflected by the rotary polyhedral mirror 7, which is rotated by a motor (not shown) and pass through the lens 8 and the cylindrical lens 9 and reach the surface of the photoconductor drum 10 to be scanned, scanning the surface.

Thus, in the conventional technique, rotary polyhedral mirrors and galvanomirrors are employed as the optical scanning means. However, the polyhedral mirrors and galvanomirrors are expensive since an extremely high accuracy is required to manufacture them. Therefore, it is difficult to provide recording apparatus employing such polyhedral mirror or golvanomirror at a low cost on the market.

SUMMARY OF THE INVENTION

It is an object of the invention to provide an inexpensive optical scanning apparatus and method which can become a substitute for the conventional optical scanning apparatus and method.

According to the invention, a hologram which is prepared by use of a ray of convergent light as an object light, is illuminated by reconstruction beams which are projected from plural point light sources near the reference light point used at the time of the recording of the hologram, so that plural convergent light points are reconstructed with a desired space therebetween. The reconstruction beams and the hologram are moved relative to each other and the scanning of the plural convergent light points is thus performed.

The invention can provide a more inexpensive optical scanning apparatus of high quality in comparison with the conventional technique.

Accordingly, an object of the present invention is to provide an optical scanning device comprising, a hologram produced by the interference of a reference light beam with another light beam, reconstruction beam generating means associated with the hologram for generating an information carrying beam and directing it toward said hologram as said reference light beam which produced said hologram was to form an information-carrying deflected light beam, and means for moving said hologram with respect to said reconstruction beam generating means to change the angle of deflection of said deflected information carrying light beam.

Another object of the present invention is to provide a method of optical scanning comprising directing an information carrying light beam through a hologram produced by the interference of a reference light beam with another light beam to produce a reconstructed light beam, said information carrying light beam being directed to the hologram as the reference light beam was to produce the hologram and moving the hologram with respect to the information carrying light beam to move the reconstructed light beam.

The various features of novelty which characterize the invention are pointed out with particularity in the claims annexed to and forming apart of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 4 is an explanatory illustration showing the reconstruction of a hologram and scanning by use of the hologram.

FIG. 5 is a diagrammatical side view of a laser recording apparatus for multi-beam simultaneous scanning apparatus according to the invention.

FIG. 6 is a diagrammatical partially enlarged view of an acousto-optic device and its neighbor shown in FIG. 5.

FIG. 8 shows the conversion of a beam to be applied into the acousto-optic device to rays of divergent light.

DESCRIPTION OF THE PREFERRED EMBODIMENTS

Figure 1:
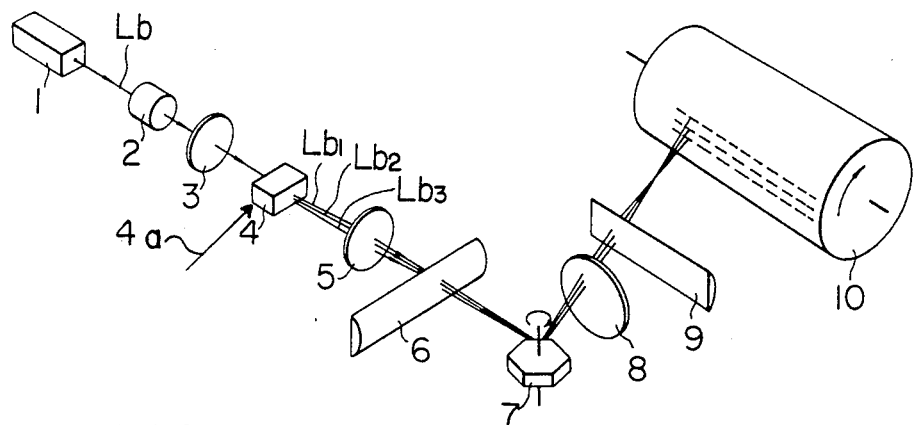
FIG. 1 is a schematic perspective view of a conventional laser recording apparatus employing a rotary polyhedral mirror as a scanning means.
Figure 2:
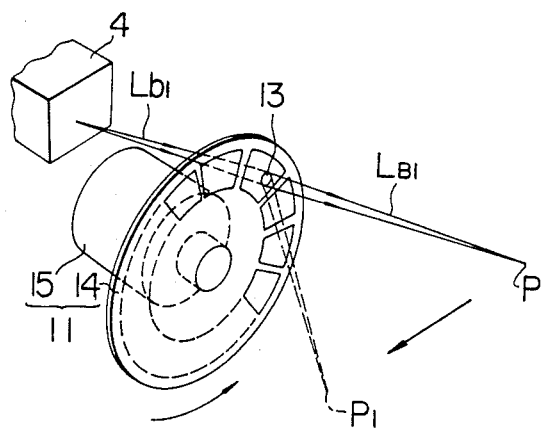
FIG. 2 is a perspective view of a light deflector for use in the invention.

The invention can be attained by substituting an inexpensive light deflector 11 as shown in FIG. 2 for the rotary polyhedral mirror 7 as shown in FIG. 1.

Referring to FIG. 2, the light deflector 11 comprises a rotary disc 14 having a number of holograms 13 with recorded information, which are equally spaced and arranged concentrically on the disc 14, and a motor 15 capable of continuously rotating the rotary disc 14 at a predetermined speed.

When the beam $L_{b1}$ is projected as reproduction light to the hologram 13 on the rotary disc 14, an output beam $L_{B1}$ which converges at point P is obtained from the hologram 13. When the rotary disc 14 is rotated in the direction of the curved arrow, while the projecting beam $L_{b1}$ is held stationary, the above-mentioned output beam $L_{B1}$ is continuously projected from the hologram 13 with its output angle always changing, as the rotary disc 14 is rotated, so that the beam $L_{B1}$ that has converged at a point P is moved in the direction of the straight arrow. When the beam $L_{b1}$ is moved to an end portion of the hologram 13, the convergent point is moved from the point P to a point $P_1$. In other words, the output beam $L_{B1}$ scans by a distance equivalent to the distance from the point P to the point $P_1$. Therefore, when a surface of the photoconductor drum 10 to be scanned is positioned at the point P, scanning can be performed by the light deflector 11. In such a construction, each scan line is produced by each of the holograms recorded on the rotary disc 14.

Figure 3:
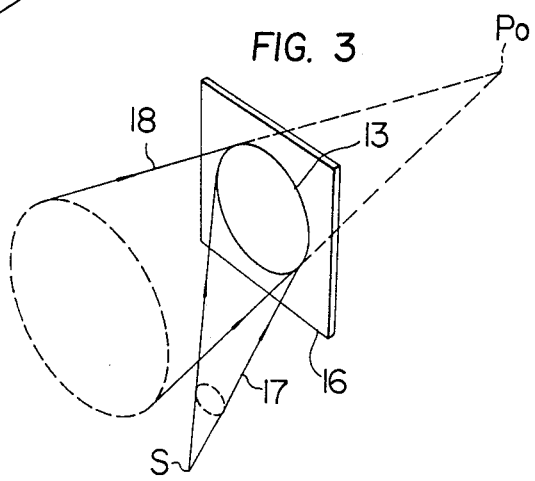
FIG. 3 shows a method for preparing a hologram for use in the invention.

The hologram having the above-mentioned function is prepared as follows: Referring to FIG. 3, reference numeral 16 represents a photosensitive material portion which constitutes part of the rotary disc 14. An object beam 17 from a point light source S, and a reference beam 18 which converges at point $P_0$ are projected to the photosensitive material portion 16 so that the hologram 13 is recorded on the photosensitive portion 16 by the interference fringes of the two beams 17, 18. In other words, a sort of out-of-axis Fresnel's zone plate is recorded on the photosensitive portion 16. In this example, the divergent spherical wave of the beam 17 and the convergent spherical wave of the beam 18 are employed. A plane wave can also be employed for the beam 17.

By use of the thus recorded hologram 13, reconstruction of images and scanning are performed as shown in FIG. 4. First, the beam $L_{b1}$, which is part of the beam 17 employed when recording the hologram 13, is used as a reconstruction light and projected toward part of the hologram 13. At this time, the beam $L_{B1}$ having the characteristic of part of the beam 18 is reconstructed behind the photosensitive material portion 16. Assuming the convergent point of the beam $L_{B1}$ is the point P, the position of the point P is continuously changed as the photosensitive portion 16 is moved. This is because the beam $L_{B1}$ comes from the hologram surface while changing its output angle continuously as the photosensitive portion 16 is moved. In the case of FIG. 4, as the photosensitive portion 16 is moved in the direction of arrow 24, the point P is also moved parallel to the movement of the photosensitive portion 16 in the direction of arrow 25 and reaches the point $P_1$.

Thus, the convergent point of the beam $L_{B1}$ scans as the photosensitive portion 16 is moved.

A simultaneous scanning by use of the light deflector 11 will now be explained.

An acousto-optic device driven by multi-frequency or a semi-conductor laser array can be employed as a means for producing beams as a hologram reconstruction light which illuminates holograms.

First, the use of the acousto-optic device will be explained. For a better understanding, a case where there are three frequencies for driving the acousto-optic device, namely a case where the number of lines to be scanned is three, will be explained.

Referring to FIG. 5, image signals $S_1$, $S_2$ and $S_3$ for three lines are synthesized with carriers having frequencies $f_1$, $f_2$ and $f_3$, respectively, which are produced by oscillators $O_{s1}$, $O_{s2}$ and $O_{s3}$, in mixers $M_1$, $M_2$ and $M_3$, and the respective synthesized signals are further synthesized into one signal in mixer $M_s$ and applied to the acousto-optic device 4.

In the meantime, a laser beam $L_b$ is converted into a convergent light by the convergent lens 3 and the convergent light illuminates the acousto-optic device 4. The laser beam $L_b$ is divided into one zero order light $L_{b0}$ and three first order diffraction beams $L_{b1}$, $L_{b2}$ and $L_{b3}$ by an acoustic optical effect of the acousto-optic device 4 and the divided light beams $L_{b0}$, $L_{b1}$, $L_{b2}$, $L_{b3}$ are projected from the acousto-optic device 4.

These beams $L_{b1}$, $L_{b2}$ and $L_{b3}$ respectively correspond to the frequencies $f_1$, $f_2$ and $f_3$ and come out with diffraction angles $\theta_1$, $\theta_2$ and $\theta_3$ with respect to the zero order light $L_{b0}$, respectively. FIG. 6 is an enlarged view of the diffraction of these beams.

The beams $L_{b1}$, $L_{b2}$ and $L_{b3}$ contain image signals $S_1$, $S_2$ and $S_3$, respectively. Assuming that the wavelength of the laser beam $L_b$ is $\lambda$, and that the difference of the frequency of ultrasonic waves which transmit within the acousto-optic device 4 is $\Delta f$, and that the sonic speed of the ultrasonic waves is V, the difference of the diffraction angle of each of the beams $L_{b1}$, $L_{b2}$ and $L_{b3}$, $\Delta\theta$, can be represented by the following equation:

$$\Delta\theta \approx \frac{\lambda \cdot \Delta f}{2V} \qquad (1)$$

When an He-Ne laser ($\lambda = 633$ mm) is employed as the light source of the laser beam $L_b$ and PbMoO$_4$ (V = 3.63 km/sec) is employed as an acousto-optic element, and the difference of each frequency is set at $\Delta f = 17$ MHz, $\Delta\theta = 1.5$ mrad from Equation (1).

Each of the beams $L_{b1}$, $L_{b2}$ and $L_{b3}$ converges on a Q—Q plane at a distance $D_1$ behind the acousto-optic device 4. Assuming that the distance between any of the adjacent convergent light points on the Q—Q plane is $\Delta x_1$, the distance $\Delta x_1$ can be represented by the following equation:

$$\Delta x_1 = D_1 \cdot \Delta\theta = \frac{\lambda \cdot \Delta f \cdot D_1}{2V} \qquad (2)$$

Each of the beams $L_{b1}$, $L_{b2}$ and $L_{b3}$, after having converged on the Q—Q plane, travels divergently from the Q—Q plane and illuminates the holograms on the rotary disc 14. The distance between the Q—Q plane and the holograms is $D_2$. A group of the convergent light points of the respective beams $L_{b1}$, $L_{b2}$ and $L_{b3}$ on the Q—Q plane are set so as to be almost aligned with the axis of rotary disc 14. This is because the holograms on the rotary disc 14 are arranged in a concentric circle whose center is at the rotary shaft in order that the reconstruction condition always satisfies a Bragg condition when the rotary disc 14 is driven.

The three beams $L_{b1}$, $L_{b2}$ and $L_{b3}$, which have entered the holograms on the rotary disc 14, function as the reconstruction light for the holograms, so that the holograms produce three convergent beams $L_{B1}$, $L_{B2}$ and $L_{B3}$ corresponding to each of the beams $L_{b1}$, $L_{b2}$ and $L_{b3}$, directing them towards the surface of the photoconductor drum 10 to be scanned. Each of the beams $L_{B1}$, $L_{B2}$ and $L_{B3}$ forms an image with a desired space therebetween on the scanned surface of the photoconductor drum 10, and as the rotary disc 14 is rotated, scanning is performed in the direction perpendicular to the plane of FIG. 5.

The spaces between the convergent light points of the beams $L_{B1}$, $L_{B2}$ and $L_{B3}$ on the scanned surface directly correspond to the spaces between the scanning lines. An adjustment procedure for adjusting the spaces between the scanning lines will now be explained.

For convenience of explanation, it is assumed that the space between the scanning lines is $\Delta x_f$ and the distance between the holograms on the rotary disc 14, and the scanned surface of the photoconductor drum 10 is $D_3$.

As to the preparation of the holograms, an outline of the procedure has already been explained with reference to FIG. 3. A supplementary explanation will now be made here.

A hologram on the rotary disc 14, for example, the hologram 13, is recorded by the interference of the beam 18 (convergent spherical wave) which converges on the point $P_0$ (O, O, $D_3$) and the beam 17 (divergent spherical wave) which diverges from the point S (O, O, $-D_2$). When the hologram 13 is illuminated by a beam $L_{b1}$ which is projected from the light source position S and is equivalent to the beam 17, the beam $L_{B1}$ which converges on the point $P_0$ is reproduced, and if the hologram 13 is illuminated by a beam $L_{b2}$, which is projected from a light source position $S\Delta x$ away from the point S in the x-axis by the distance of $\Delta x$ and which is equivalent to the beam 17, the beam $L_{B2}$ is reconstructed, which converges at a position away from the point $P_0$ in the x-axis by the distance $\Delta x_F$. This relationship can be represented by the following equation:

$$\Delta x_F = -\frac{D_3}{D_2} \cdot \Delta x \qquad (3)$$

Figure 7:
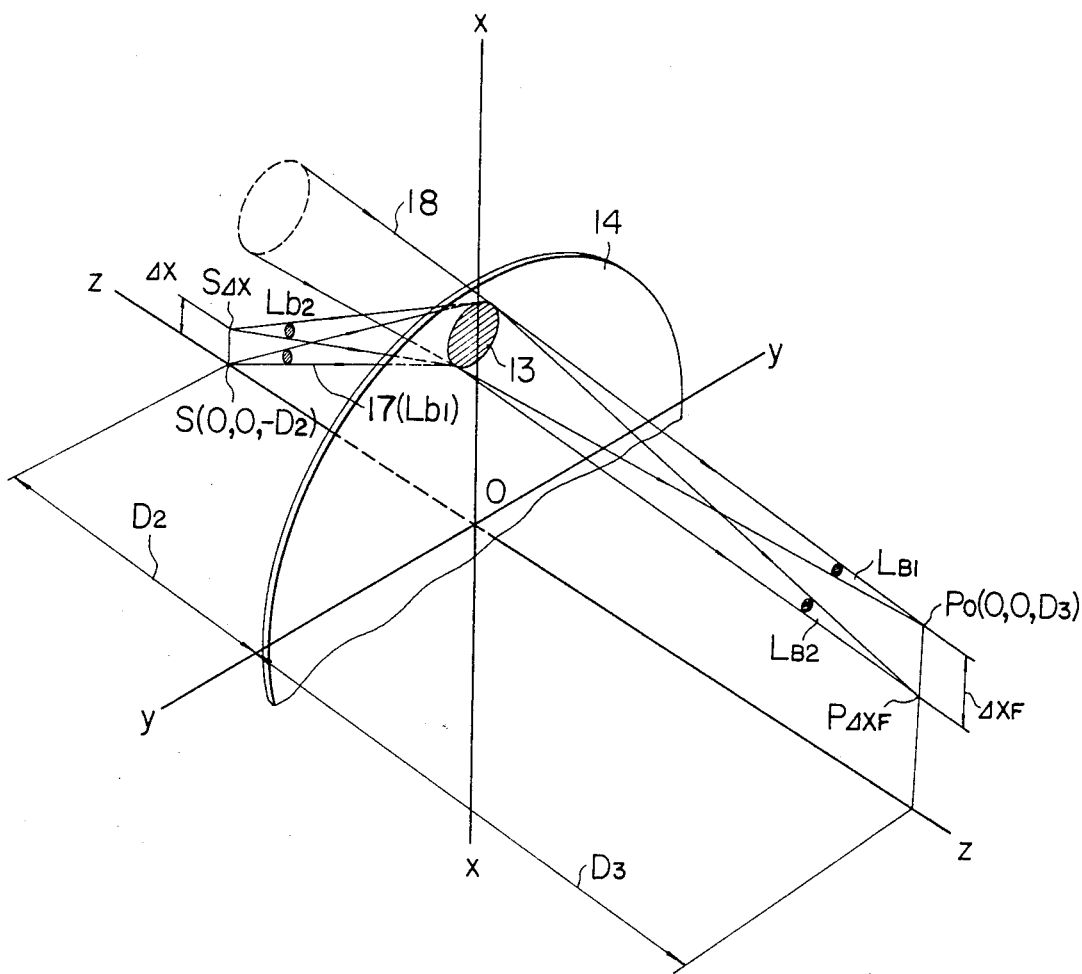
FIG. 7 is an explanatory illustration showing the adjustment of a beam position when recording and reconstructing a hologram.

The points S and $S\Delta x$ in FIG. 7 correspond to the respective convergent points of the beams $L_{b1}$ and $L_{b2}$ on the Q—Q plane in FIG. 6 and therefore $\Delta x$ in Equation (3) corresponds to $\Delta x_1$ in Equation (2). Furthermore, the distance $\Delta x_F$ corresponds to the scanning line space $\Delta x_f$. Using Equation (2), Equation (3) can be rewritten as follows:

$$\Delta x_f = -\frac{D_3 \cdot D_1}{D_2} \cdot \frac{\lambda \cdot \Delta f}{2V} \qquad (4)$$

When the holograms are prepared, they are recorded by adjusting various conditions of Equation (3) in conformity with the distance $\Delta x_F$ of Equation (3) which is determined by the value of a desired space of the scanning lines, and when images are reconstructed by the scanning of the light deflector 11, the value of the scanning line space $\Delta x_f$ is adjusted so as to become equivalent to the value of the distance $\Delta x_F$ which was set when the holograms were prepared, in view of the various conditions of Equation (4), so that the scanning is performed.

In the embodiments of FIGS. 5 and 6 according to the invention, the laser beam $L_b$ which is applied to the acousto-optic device 4 is a convergent ray of light. However, the invention is not limited to the use of such convergent ray of light, and as shown in FIG. 8, such a beam $LL_b$ as converges on a Q—Q plane and then diverges therefrom can be applied to the acousto-optic device 4. In this case, the output rays of light from the acousto-optic device 4, except a zero order light $LL_{b0}$, form plural spherical waves $LL_{b1}$, $LL_{b2}$ and $LL_{b3}$ which diverge from a group of virtual light points which are assumed to exist on the $Q_1-Q_1$ plane. In this case, preparation and reconstruction of the holograms can be performed in the same manner as mentioned previously except by substituting the $Q_1-Q_1$ plane for the Q—Q plane in FIGS. 5 and 6.

Thus, in the abovementioned embodiment, the acousto-optic device is employed as a beam generating means for reconstructing the holograms recorded on the rotary disc 14.

In the above embodiment, a plurality of independently modulated reconstruction beams are produced by applying a single laser beam to the acousto-optic element. However, the invention is not limited to the above-mentioned method for producing the reconstruction beams, but plural rays of light from plural light sources can be employed. As an example of the latter method, a semi-conductor laser array can be used as a reconstruction beam generating means.

Figure 9:
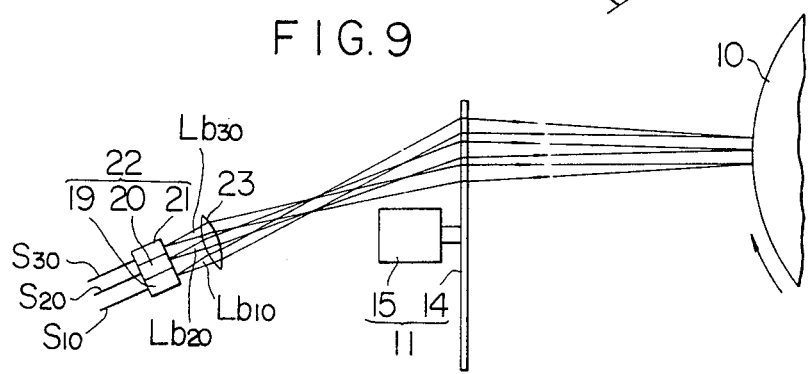
FIG. 9 is a diagrammatical side view of an embodiment of a scanning apparatus according to the invention, in which a semi-conductor laser array is employed as a beam generating means.

Referring to FIG. 9, reference numerals 19, 20 and 21 respectively represent semi-conductor lasers, which are integrated to form a semi-conductor laser array 22.

To the respective semi-conductor lasers 19, 20, 21, drive currents $S_{10}$, $S_{20}$ and $S_{30}$ containing independent image signals are applied, so that beams $L_{b10}$, $L_{b20}$ and $L_{b30}$ containing image information are projected therefrom.

By correcting the shape of each of the beams $L_{b10}$, $L_{b20}$ and $L_{b30}$ by a convergent lens 23 and applying them to the holograms on the rotary disc 14 in a manner to satisfy the reconstruction condition, plural reconstructed convergent light points can be obtained on the scanned surface of the photoconductor drum 10, and by rotating the rotary disc 14 by use of the motor 15, scanning is performed in the direction perpendicular to the plane of FIG. 9.

In the above-mentioned embodiments, light deflection is performed by the holograms recorded concentrically on the rotary disc 14. However, the invention is not limited to this but can be applied to holograms recorded on a cylindrical medium. Furthermore, the invention can be applied likewise to holograms recorded concentrically on a convex medium and a concave medium.

In FIGS. 5 and 9, the beams $L_{b1}$, $L_{b2}$ and $L_{b3}$ or the beams $L_{b10}$, $L_{b20}$ and $L_{b30}$ illuminate different portions of the holograms. However, when the space between the convergent light points is small on the Q—Q plane in FIG. 5, or when the space between each of the lasers of the semi-conductor laser array 22 is small, the above-mentioned beams illuminate almost an identical portion of the holograms. The invention can be applied to such a case exactly in the same manner.

While specific embodiments of the invention have been shown and described in detail to illustrate the application of the principles of the invention it will be understood that the invention may be embodied otherwise without departing such principles.

What is claimed is:

1. An optical scanning apparatus comprising:
    a rotary disc having a plurality of circumferentially equally spaced and disposed holograms thereon, all having a selected radial width and positioned at a single radial position on said disc, each hologram being of a type which is prepared by the interference of a reference light beam with an object light beam;
    a motor connected to said rotary disc for rotating said rotary disc continuously at a predetermined speed; and
    reconstruction beam generating means associated with said rotary disc for generating a plurality of diverging fixed information-carrying beams each at an acute angle to each other, and directing them toward and through each of said holograms sequentially, said selected radial width of each of said holograms being sufficient to receive all said information-carrying beams, said information-carrying beams acting as a plurality of reference beams to form a plurality of reconstructed light beams;
    said reconstruction beam generating means comprising a laser for producing a laser beam, beam expanding and converging lens means spaced from said laser for receiving said laser beam and converging said laser beam;
    acousto-optic means spaced from said beam expanding and converging lens means for receiving said laser beam and producing said information-carrying beams, said acousto-optic means having an uninterrupted path to said disc for said information-carrying beams; and electric circuit means connected to said acousto-optic means for producing information signals and applying said information signals to said acousto-optic means to produce said information-carrying beams, said circuit means producing a plurality of information signals each at a different frequency for producing, in said acousto-optic means, the information-carrying beams which are each directed through said holograms, said information-carrying beams all being scanned in a direction contained in a plane which is parallel to a plane containing said rotary disc.

* * * * *